Inventor.
Alf Anders Anselm Eriksson

May 1, 1962  A. A. A. ERIKSSON  3,032,156
SCREW THREAD CUTTING DEVICE
Filed June 15, 1959

Inventor:
Alf Anders Anselm Eriksson

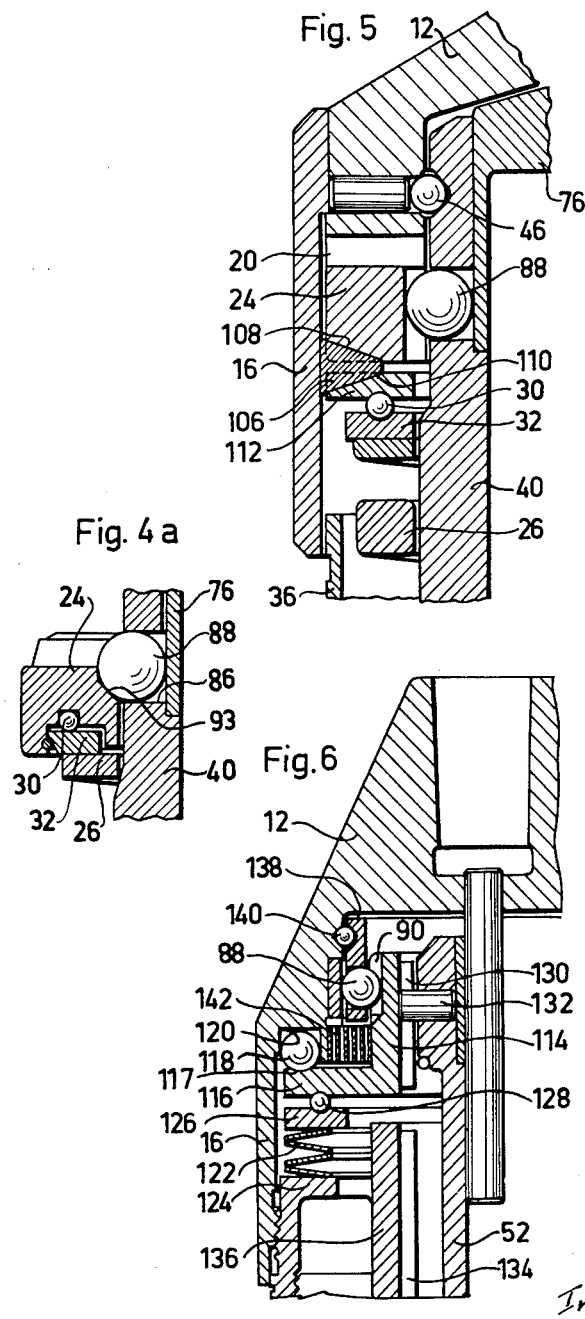

United States Patent Office 3,032,156
Patented May 1, 1962

3,032,156
SCREW THREAD CUTTING DEVICE
Alf Anders Anselm Eriksson, Nacka, Sweden, assignor to Aktiebolaget Svenska Precisionsverktyg, Nacka, Sweden, a corporation of Sweden
Filed June 15, 1959, Ser. No. 820,542
Claims priority, application Sweden June 17, 1958
7 Claims. (Cl. 192—56)

This invention relates to a screw thread cutting device.

More particularly this invention relates to a screw thread cutting device of the type comprising a rotary driving member, a rotary driven member and clutch means disposed therebetween.

Still more particularly this invention relates to a screw thread cutting device of the type comprising a rotary driving member, a rotary driven member and clutch means disposed therebetween and formed with drivers engaging one another during transfer of torque between said members but adapted to disconnect when said torque exceeds a predetermined value by an axial displacement of one of said clutch means against the action of a spring member.

One main object of the invention is to provide a screw thread cutting device of the type in consideration, which when used to cut screw threads in bottom holes substantially entirely releases the screw tap from the torque transfer when said tap reaches the bottom of the hole.

Further objects and advantages of the invention will become apparent from the following description, considered in connection with the accompanying drawings, which form part of this specification and of which:

FIG. 4a is a part-sectional view of FIG. 1 showing the driving member and the annular element in their mutual positions illustrated in FIG. 4.

FIG. 5 is an axial sectional view of a part of another embodiment of the invention.

FIG. 6 is an axial section taken in the same manner as FIG. 5 through still another embodiment of the invention.

In the various drawing figures the same reference numerals are used for the same or equivalent members or parts.

Figure 1:
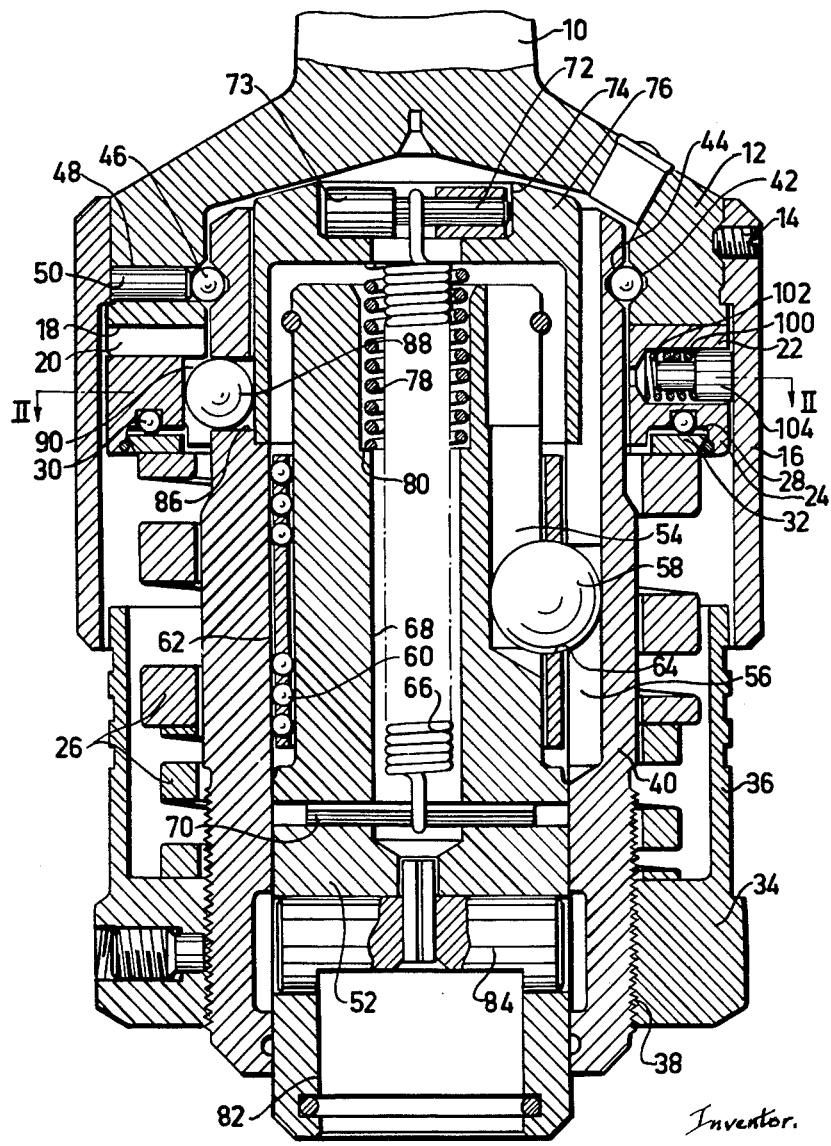
FIG. 1 is an axial sectional view of a screw cutting device embodying the invention.
Figure 2:
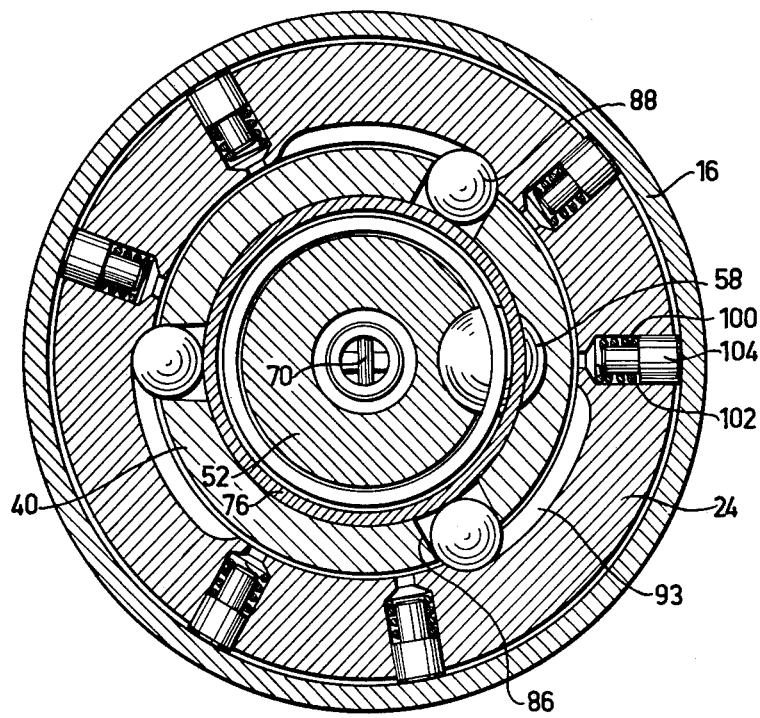
FIG. 2 is a sectional view taken along the line II—II of FIG. 1.

Referring to the drawings reference numeral 10 denotes a rotary driving spindle widening into a cup-shaped part 12. A cylindrical sleeve 16 is retained by means of a screw 14 in a fitting manner on the outer cylindrical wall face of the cup part 12 which further is formed with an annular base face 18 in a plane extending transversally to the axis of rotation of the spindle 10.

A number of peripherally equally spaced projections 20 project in an axial direction from said annular face 18. Said projections are adapted to be brought into and out of engagement with projections 22 formed so as to project in the counter-direction from an annular or sleeve element 24 disposed co-axially with said annular face 18. This annular element 24 is actuated to establish said engagement through its projections 22 by means of spring members 26 acting between a ring member 32 disposed on the lower face of the annular element 24 within an annular groove 28 by means of balls 30, and an inwardly directed annular flange 34 of a lower sleeve 36. The annular flange 34 is provided with an interior thread 38 engaging a corresponding thread on the base portion of a cylindric guide body 40 projecting into the sleeves 16, 36 and which at its top end is rotatably but axially stationarily connected with the cup part 12. This connection is brought about by means of two opposed annular grooves 42, 44 formed on the internal wall of the cup part and the external wall of the guide body 40, respectively, and into which grooves a plurality of balls 46 is inserted. For introduction of the balls a bore 48 is formed in the wall of the cup portion, which bore is locked after introduction of the balls by means of a plug 50.

Mounted within the sleeve-shaped guide body 40 is a cylindrical body 52 constituting together with said guide body the principal parts of the driven member of the screw-thread cutting device. The bodies 40 and 52 are to a limited degree axially displaceable, but rotationally stationarily relative one another. To this end the body 52 is formed with an external axial groove 54 and the guide body 40 with a corresponding internal axial groove 56. Inserted into these grooves is a ball 58 which thus transfers torque but allows limited axial mutual displacement between the bodies 40, 52. A bearing between the said bodies is constituted by a large number of balls 60 located within a sleeve-formed ball retainer 62, having an opening 64 for the ball 58. For limitation of the axial displacements the body 52 is suspended by a helical spring 66 mounted in a central bore 68 of the body 52 and acting between a spring bolt 70 located in the base portion of said body and an upper bolt 72 which by means of rollers 73 rests in a recess 74 of a cup-like element 76 disposed rotatably within the top portion of the guide body 40. Acting between this element 76 and the body 52 is moreover a further spring 78 which is stronger than the spring 66 and placed about this latter. The spring 78 acts between the inner bottom wall of the cup element 76 and a shoulder 80 formed in the bore 68. The lower end of the body 52 has a further axial bore 82 intended to take up a chuck holding a pilot tap, said chuck and said pilot tap not being shown in the drawings. To carry along this chuck in the rotational movement of the driven member a transversal tap 84 is located in the body 52.

Figure 3:
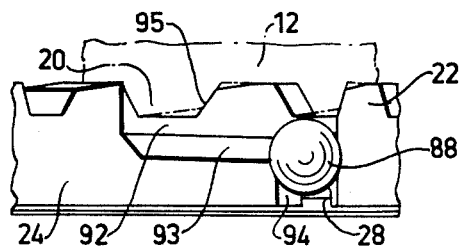
FIGS. 3 and 4 are perspective views of portions of a driving member forming part of the device and an annular element in connection with said driving member in two different positions of operation, said figures illustrating the position of these members relative one another when transferring torque between them and when out of connection respectively.
Figure 4:
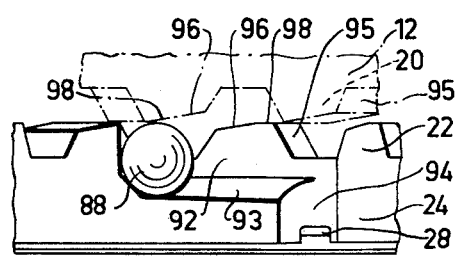

As will be readily understood from the structural description hereinbefore, torque is transferred on rotation of the driving spindle 10 from the part 12 through the projections 20, 22 to the annular element 24. To transfer the torque from the element 24 to the guide body 40, three peripherally equally spaced radial bores 86 are formed in said body to receive locking members which in the embodiment shown have the shape of balls 88 but may be constituted also by rollers, pins or the like. These balls are kept by the rotatable cup element 76 so as to project partly from said bores 86 and each with its projecting portion to engage a recess or groove 90 formed on the inner face of the annular element 24. As is in detail shown in the FIG. 3 and 4 each of these grooves has two rectangular portions extending relatively to one another. One of these portions and denoted by 92 has a limited peripheral extent and is suitably formed with a lower guide face 93, having a slight axial slope whereas the other portion denoted by 94 extends axially and preferably has a slight inclination relative to the plane of rotation. With the balls 88 located in the axially extending portions of the grooves the torque is transferred from the annular element 24 to the guide body 40 and therefrom through the ball 58 to the driven member 52 carrying along the pilot tap.

The guide surfaces 93 have besides their axial inclination suitably also a slope in the radial direction as is shown in FIG. 4a. Due to the fact that the balls 88 have their centers located within the bores 86 said slope will produce an arm or lever of the torque causing the balls in their movement relative to the guide surfaces to rotate and further result in that the axial thrust from the springs 26 is taken up by the guide body 40 through the balls 88. By retaining the balls from an inwardly directed displacement within the bores 86 by means of the freely rotatable element 76 it is further ensured that said rolling movement of the balls is accomplished with a minimum of frictional resistance.

When under the operation of screw threading a bottom hole the pilot tap reaches the bottom of the hole the rotation of the body 52 is stopped and as a consequence also the rotation of the guide body 40 and the annular element 24 connected with said body by the balls 88. This results in that the projections 20 and 22 formed on the part 12 and the annular element 24, respectively, will slide the one upon the other. Said sliding movement is ensured by the shape of the projections which are formed with inclined engagement surfaces 95 intended to facilitate co-operation in a peripheral direction of the projection. In order still further to increase the possibilities of governing the torque when such disengagement is to be effected and moreover to ensure a renewed engagement between the projections when the direction of rotation of the spindle 10 is reversed, the surfaces of the projections facing one another in an axial direction form at least partly an angle of inclination to the plane transversal to the axis of rotation. In the embodiment shown said surfaces are subdivided into a portion 96 extending at such an angle of inclination and a portion 98 extending in said plane. When the projections 20, 22 slide the one upon the other the annular element 24 is displaced axially downwards against the action of the spring members 26 which will result in that the groove portions 94 formed on the annular element are displaced relatively to the balls 88 so that the groove portions 92 will come on level with the balls. Due to the peripheral extension of these groove portions 92 the annular element 24 has thus attained the possibility of turning relatively to the balls 88, which thus are caused to engage the guide surfaces 93 and thus to retain the annular element in its axially displaced position. Since the guide surfaces have an axial slope the balls 88 will still increase said axial displacement. As a consequence of the locking of the annular element 24 in its axially displaced position by the balls 88 the projections 20, 22 are prevented from engaging one another. If the guide surfaces 93 are formed with an axial inclination the surfaces 96, 98 facing one another of the projections 20, 22 are brought entirely out of contact with one another due to which fact the pilot tap is substantially totally released from the torque. When the direction of rotation of the driving spindle 10 is reversed the annular element 24 is turned back either through friction between the surfaces 96, 98 of the projections 20, 22, respectively, or by co-operation between the inclined guide surfaces 93 and the balls 88 so that these latter when the annular element moreover is returned in the axial direction by the springs 26 regain their initial positions in the groove portions 94 and renewed torque transfer is established through the projections At large speeds of rotation the moment of inertia is as a rule sufficient to the displacement relative one another of the balls 88 and the groove portions 92 required for causing the disengagement. However, in order to make sure that said displacement is effected the annular element 24 may be formed with radial recesses 100, which suitably in pairs are peripherally equally distributed over the annular element to receive bolts 104 actuated by springs 102 in an outward direction against the sleeve 16. Such bolts 104 may be housed instead of the recesses in axial bores and then directly act on the surface 18 of the cup part 12 in which case the projection 20 must have less breadth than has been shown in the embodiment according to FIGS. 1 to 4.

In the embodiment shown in FIG. 5 the friction bolts 104 are replaced by wedge-shaped elements 106 which with suitable peripheral spacing are inserted between outwardly diverging inclined surfaces 108, 110 formed on the annular element 24, and a further ring 112 disposed between the ring member 32 transferring the pressure of the springs 26 and said annular element 24, respectively. In this way the force by which the annular element 24 is carried along by the driving cup element 12 is influenced and balanced by means of the spring members 26.

The embodiment shown in FIG. 6 illustrates an application of the invention to a reversible screw thread cutting apparatus of the general type disclosed in the patent specification No. 2,795,146. This embodiment also includes the cup-shaped part 12 carrying the cylindric sleeve 16 and the body 52 carrying the screw tap. Within the members 12, 16 is mounted a sleeve element 114 coaxial with the part 12 and formed with an outwardly directed annular flange 116. This annular flange has several peripherally equally spaced part-spherical recesses 117, receiving balls 118 otherwise located in a corresponding number of axial bores 120 in the part 12. The sleeve element 114 is loaded in a direction towards the part 12 by means of cup springs 122 acting between an annular shoulder 124 projecting into the sleeve 16 and a ring member 126 in turn is pressed against the base face of the annular flange 116 by the springs 122 through an annular row of balls 128 located in annular grooves facing one another. The sleeve element 114 has the wall of its bore provided with axially extending diametrically opposed projections 130 which engage radially projecting pins 132 secured within the body 52. With the positions of the members described hereinbefore which is shown in the FIGURE 6 direct drive is effected from the part 12 through the balls 118 to the sleeve element 114 and further through the projections 130 to the body 52. In order to accomplish reversed drive the part 12 and the parts connected therewith are displaced in an axial direction relative to the body 52 so as to cause the pins 132 to engage inner axial projections 134 of a further sleeve element 136 mounted below the sleeve element 114, said sleeve element 136 being in driving connection with the sleeve 16 through a reversing device for the detailed description of which reference is made to the patent specification named hereinbefore.

When in the operation of cutting a bottom hole the rotation of the body 52 is stopped by the pilot tap reaching the bottom of the hole, the balls 118 will be forced to roll upwards from the part-spherical recesses 117 by which rolling movement the sleeve element 114 is displaced in a downward direction. To retain the sleeve element 114 in this position and thus to prevent the balls 118 from producing a rattling noise in the recesses 117, angular grooves 90 are formed in the external surface of the sleeve element 114 in the same manner as in the embodiments described earlier which grooves are formed to co-operate with peripherally equally spaced balls 88. These balls which, however, in the embodiment according to FIG. 6 do not participate in the torque transfer are located in a retainer ring 138 which by means of grooves facing one another and a roll of balls 140 is mounted rotatably but axially stationarily within the cup-shaped part 12. The co-operation of the balls 88 with the grooves 90 is effected in the same manner as in the embodiments described in connection with the FIGURES 1 to 5. For return of the sleeve element 114 so as to allow the balls 88 to regain their positions in the axial portions of the grooves 90 a spiral spring 142 is inserted between the part 12 and the sleeve element 114, one end of which spring is secured in either the part 12 or the element 114 and the other end of which is in frictional engagement with the other part.

As an alternative applicable to all embodiments described the balls 88 may be disposed in the members 24, 114 which are to be retained by the balls in the disconnected position, and the grooves 90 may be formed in the facing members 40, 138.

While several embodiments of the invention have been shown and described it is to be understood that this is for purpose of illustration only and that the invention is not to be limited thereby, but its scope is to be determined by the appended claims.

What I claim is:

1. A screw thread cutting device comprising a rotary driving member, a rotary driven member, and clutch means for driving said driven member from said driving member comprising a pair of coaxial coupling members having interconnecting means for transmitting torque between said coupling members so long as the torque does not exceed a predetermined value and operative upon rotation of one coupling member relative to the other to displace one of said coupling members axially to disengage said coupling members, spring means constantly urging said coupling members into operative engagement to transmit torque, said spring means being yieldable when said predetermined value of torque is exceeded to permit relative rotation between said coupling members, one of said coupling members being secured to said driving member coaxially thereof to rotate therewith, and means connecting the other coupling member to said driven member comprising a rotatable member, means connecting said rotatable member to said driven member for rotation therewith, a locking member engaged in confronting recesses in said other coupling member and said rotatable member for connecting said rotatable member to said other coupling member, one of said recesses being operative to prevent axial movement of said locking member relative to the member containing said one recess, and the other of said recesses having two portions of different axial extent axially of said coupling members, said locking member being disposed to engage in one of said portions when said coupling members are engaged and being moved out of said one portion and onto the other portion when said coupling members are moved to disengaged position, said other portion including a surface inclined relative to a plane perpendicular to the axis of said coupling members and on which said locking member rides, when said coupling members are disengaged to maintain them disengaged, said inclined surface tending to increase the relative axial displacement of said coupling members as said locking member rides on said surface.

2. A screw thread cutting device as claimed in claim 1, wherein said coupling members are toothed coupling members having their teeth projecting from opposed faces, the mating side tooth surfaces of said teeth being inclined at obtuse angles to a plane perpendicular to the common axis of said coupling members, whereby upon rotation of one coupling member relative to the other the mating tooth surfaces of the two coupling members will ride on one another to effect axial disengagement of said coupling members.

3. A screw thread cutting device comprising a rotary driving member, a rotary driven member, and clutch means for driving said driven member from said driving member member comprising a pair of coaxial coupling members having opposed faces with opposed concavities therein, balls interposed between said faces and engaged, respectively, in opposed cavities to transmit torque between said coupling members so long as the torque does not exceed a predetermined value, the concavities in the face of one coupling member at least being shallow enough for the balls to ride out of them when the torque exceeds said predetermined value, said balls being operative upon rotation of one coupling member of said pair relative to the other to displace one of said coupling members axially to disengage said coupling members, spring means constantly urging said coupling members into operative engagement to transmit torque, said spring means being yieldable when said predetermined value of torque is exceeded to permit relative rotation between said coupling members, one of said coupling members being secured to said driving member coaxially thereof to rotate therewith, and means connecting the other coupling member to said driven member comprising two cooperating elements, one of which is a recess, and the other of which is a locking member engaged in said recess, one of said cooperating elements being carried by said other coupling member, the other of said cooperating elements being connected to said driven member against rotation relative thereto, said recess having two portions of different axial extent axially of said coupling members, said locking member being disposed to engage in one of said portions when said coupling members are engaged and being moved out of said one portion and onto the other portion when said coupling members are moved to disengaged position, said other portion including a surface inclined relative to a plane perpendicular to the axis of said coupling members and on which said locking member rides, when said coupling members are disengaged to maintain them disengaged, said inclined surface tending to increase the relative axial displacement of said coupling members as said locking member rides on said surface.

4. A screw thread cutting device as claimed in claim 1 in which said one recess is formed in said rotatable member and said other recess is formed in said other coupling member, and said locking member is a ball-shaped member retained in said one recess and extending outwardly therefrom to engage in said other recess.

5. A screw thread cutting device as claimed in claim 4 wherein said other coupling member and said rotatable member are disposed in concentric, spaced relation about said driven member, and a sleeve is rotatably mounted within said rotatable member coaxially of said driving member, said ball-shaped member is rotatable in said one recess and rides on the periphery of said sleeve and said surface, respectively, and said surface is radially inclined whereby said ball-shaped member is caused to rotate in said one recess when riding on said surface.

6. A screw thread cutting device comprising a rotary driving member, a rotary driven member, and clutch means for driving said driven member from said driving member comprising a pair of coaxial coupling members having interconnecting means for transmitting torque between said coupling members so long as the torque does not exceed a predetermined value and operative upon rotation of one coupling member relative to the other to displace one of said coupling members axially to disengage said coupling members, spring means constantly urging said coupling members into operative engagement to transmit torque, said spring means being yieldable when said predetermined value of torque is exceeded to permit relative rotation between said coupling members, one of said coupling members being secured to said driving member coaxially thereof to rotate therewith, and means connecting the other coupling member to said driven member comprising two cooperating elements, one of which is a recess formed in an annular member secured to said other coupling member, and the other of which is a ball-shaped member disposed to engage in said recess and in a registering recess formed in a retainer which is connected to said driven member and operative to prevent relative rotation between said ball-shaped member and said driven member, said recess having two portions of different axial extent axially of said coupling members, said ball-shaped member being disposed to engage in one of said portions when said coupling members are engaged and being moved out of said one portion and onto the other portion when said coupling members are moved to disengaged position, said other portion including a surface inclined relative to a plane perpendicular to the axis of said coupling members and on which said ball-shaped member rides, when said coupling members are disengaged to maintain them disengaged, said inclined surface tending to increase the relative axial displacement of said coupling members as said ball-shaped member rides on said surface, and a sleeve secured to said driving member radially outside said annular member, a reciprocable element mounted in said annular member and spring-pressed outwardly to engage the inside surface of said sleeve so that after disengagement of said coupling members, said annular member is carried along by said sleeve as far as permitted by the angular extent of said recess in a circumferential direction.

7. A screw thread cutting device comprising a rotary driving member, a rotary driven member, and clutch means for driving said driven member from said driving member comprising a pair of coaxial coupling members having interconnecting means for transmitting torque between said coupling members so long as the torque does not exceed a predetermined value and operative upon rotation of one coupling member relative to the other to displace one of said coupling members axially to disengage said coupling members, spring means constantly urging said coupling members into operative engagement to transmit torque, said spring means being yieldable when said predetermined value of torque is exceeded to permit relative rotation between said coupling members, one of said coupling members being secured to said driving member coaxially thereof to rotate therewith, and means connecting the other coupling member to said driven member comprising two cooperating elements, one of which is a recess formed in an annular member secured to said other coupling member, and the other of which is a ball-shaped member disposed to engage in said recess and in a registering recess formed in a retainer which is connected to said driven member and operative to prevent relative rotation between said ball-shaped member and said driven member, said recess having two portions of different axial extent axially of said coupling members, said ball-shaped member being disposed to engage in one of said portions when said coupling members are engaged and being moved out of said one portion and onto the other portion when said coupling members are moved to disengaged position, said other portion including a surface inclined relative to a plane perpendicular to the axis of said coupling members and on which said ball-shaped member rides, when said coupling members are disengaged to maintain them disengaged, said inclined surface tending to increase the relative axial displacement of said coupling members as said ball-shaped member rides on said surface, and a sleeve secured to said driving member radially outside said annular member, wedge-shaped members, each having inwardly converging active surfaces, and secured inside said sleeve to project radially inwardly, a second annular member interposed between said spring means and said other coupling member to transmit the spring pressure to said coupling members, and said other coupling member and said second annular member having surfaces opposed to and adapted to cooperate with the active surfaces of said wedge members so that said driving member carires the first-named annular member along, after disengagement of said coupling members, to the extent permitted by the angular length of said recess in a circumferential direction.

References Cited in the file of this patent

UNITED STATES PATENTS

| | | |
|---|---|---|
| 1,953,182 | Lyon | Apr. 3, 1934 |
| 2,592,103 | Alfredeen | Apr. 8, 1952 |
| 2,690,090 | Pedersen | Sept. 28, 1954 |
| 2,775,327 | Gearhart | Dec. 25, 1956 |

FOREIGN PATENTS

| | | |
|---|---|---|
| 462,587 | Great Britain | Mar. 11, 1937 |
| 892,097 | Germany | Oct. 5, 1953 |
| 304,823 | Switzerland | Apr. 1, 1955 |
| 550,277 | Italy | Oct. 23, 1956 |
| 1,034,952 | Germany | July 24, 1958 |